United States Patent

Paraskewik

[15] 3,670,620
[45] June 20, 1972

[54] AUTOMATIC SWAY BRACE DEVICE

[72] Inventor: William Paraskewik, Lansdale, Pa.

[73] Assignee: The United States of America as represented by the Secretary of the Navy

[22] Filed: Nov. 23, 1970

[21] Appl. No.: 92,039

[52] U.S. Cl. ............................................. 89/1.5 B, 294/83
[51] Int. Cl. .......................................................... B64d 1/04
[58] Field of Search ..................... 192/56; 64/29; 244/137; 89/1.5, 1.5 B; 294/83

[56] References Cited

UNITED STATES PATENTS

| 2,010,511 | 8/1935 | Crawford | 89/1.5 B |
| 2,826,107 | 3/1958 | Woods | 64/29 |
| 2,919,602 | 1/1960 | Spraragen | 64/29 |
| 2,526,903 | 10/1950 | Ruppert | 89/1.5 B |

FOREIGN PATENTS OR APPLICATIONS

| 344,891 | 11/1936 | Italy | 89/1.5 B |
| 594,609 | 11/1947 | Great Britain | 89/1.5 B |

*Primary Examiner*—Samuel W. Engle
*Attorney*—R. S. Sciascia and Henry Hansen

[57] ABSTRACT

Automatic sway brace device for restraining stores mounted on an aircraft. Paired sets of scissored sway braces, restrained by clamps mounted on a threaded shaft, extend outward from the bottom of a rack for abutting a store secured in the rack.

1 Claim, 5 Drawing Figures

INVENTOR
WILLIAM PARASKEWIK
BY
ATTORNEY

INVENTOR
WILLIAM PARASKEWIK
BY
ATTORNEY

AUTOMATIC SWAY BRACE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to stores suspension apparatus, and more particularly to improvements in bracing devices used to prestress and brace the connection between a store and an airframe to limit the relative motion of the store with respect to the airframe while suspended therefrom.

Store racks used on high performance aircraft have become highly sophisticated apparatus often requiring great care and time in loading, particularly when involving line explosives on aircraft carrier decks. This works against the logistics of short aircraft down-time and limited loading area. Typically the operation of loading a bomb onto an external bomb rack involves the procedures of prestressing a set of sway braces (usually four per bomb), where the procedure consists of individually torquing bolts at the end of each sway brace to a predetermined torque level such that the bomb suspension is put into tension using up all the clearances and rigid connections restrain the bomb from pivoting. Consequently precise torque readings are necessary in order to insure that structural limits of the bomb suspension are not exceeded. Such arrangements consume valuable aircraft time and carrier space.

SUMMARY OF THE INVENTION

Accordingly, it is the general purpose and object of the invention to provide an automatic sway brace device which will allow for simplified loading operations of stores or bombs unto an aircraft thereby reducing its down-time.

Another object of the invention is to provide an automatic sway brace device which will allow for precise bracing forces symmetricaly applied to the stores or bomb.

Briefly these and other objects of the invention are accomplished by combining the sway braces into scissored pairs, each pair being extended by a turnbuckle arrangement having an integral torque limiter unit preset to the desired torque. The pivot of each scissored pair is fixed to the bomb rack such that the closing and opening of the scissored sway braces by the turnbuckle changes the dimension between the contact pad at the end of each sway brace relative the suspension hangers on the bomb rack.

DESCRIPTION OF THE PREFERRED EMBODIMENT

Figure 1:
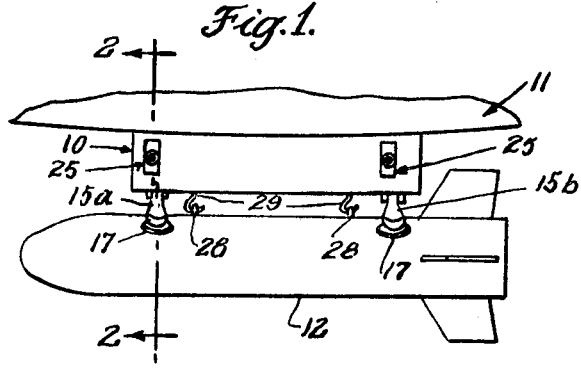
FIG. 1 is a diagrammatic elevational view illustrating an application of an automatic sway brace device for stores constructed in accordance with the present invention applied to a load such as a bomb.
Figure 2:
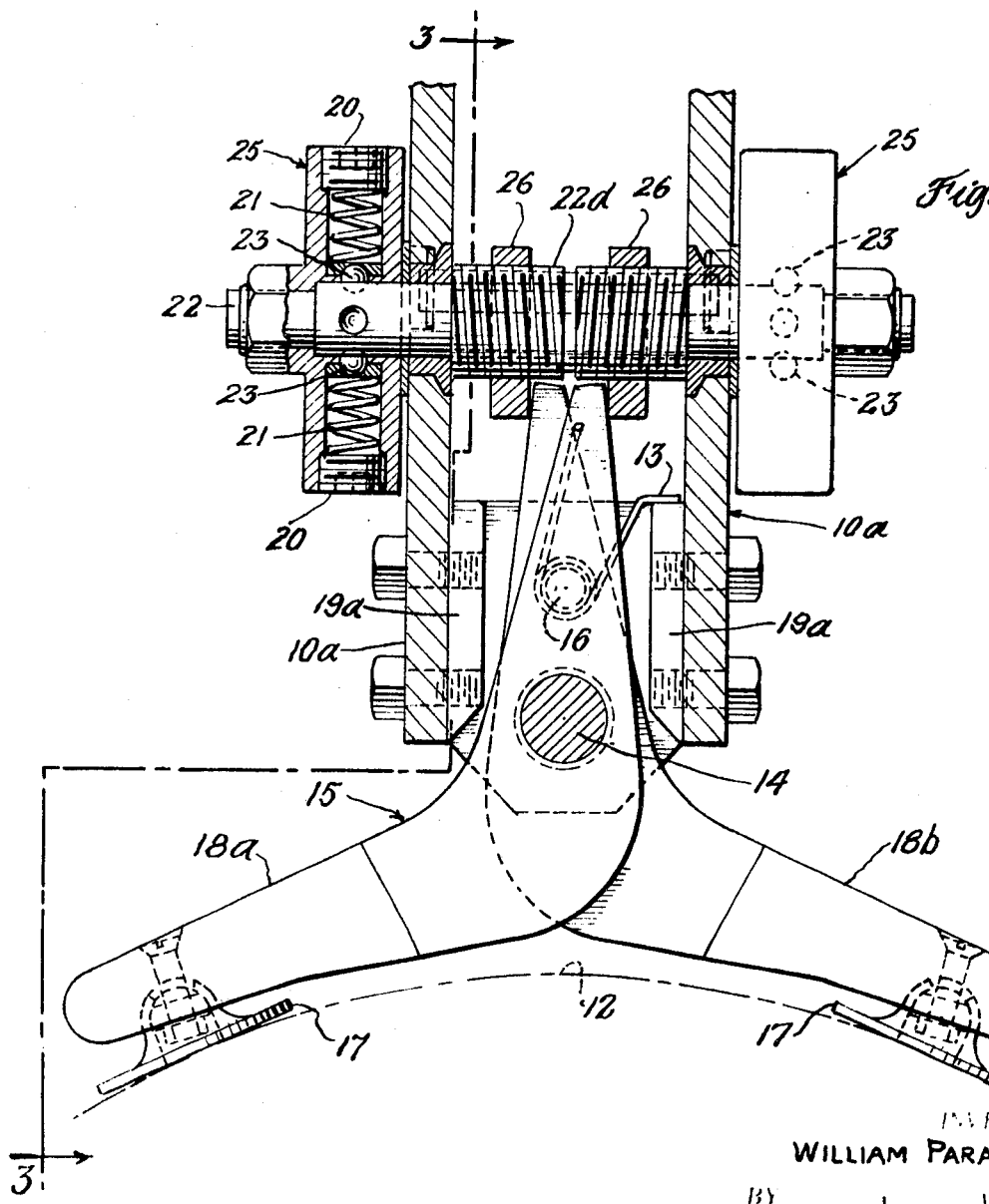
FIG. 2 is an enlarged cross section of the sway brace device taken as indicated by the arrows 2—2 in FIG. 1.
Figure 3:
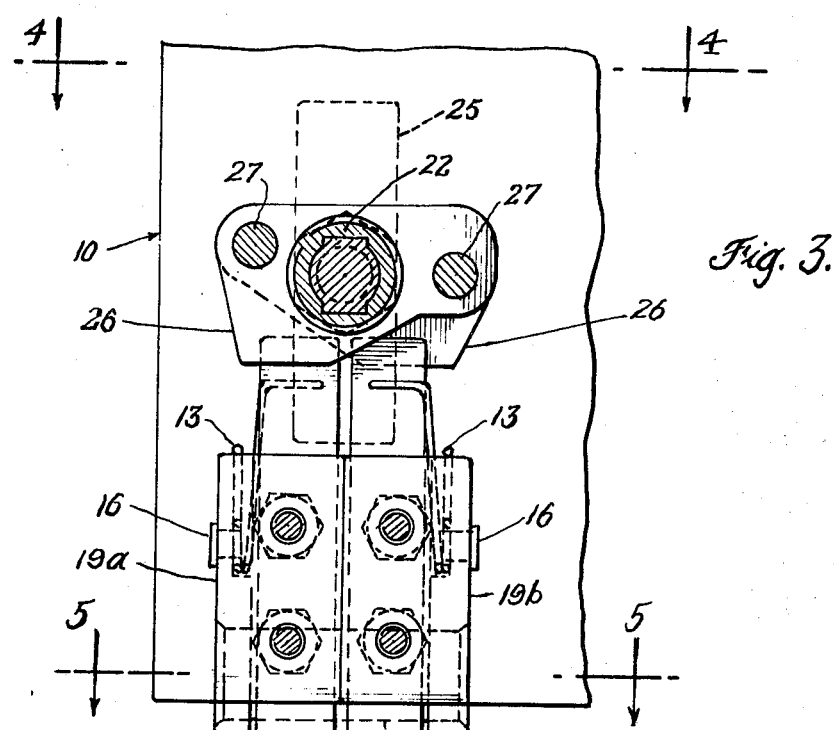
FIG. 3 is a sectional view taken approximately on the line 3—3 of FIG. 2.

Referring now to FIG. 1, a bomb rack 10 is shown extending from the underside 11 of an aircraft with a bomb 12 suspended by hangers 28 from hooks 29 on the underside of rack 10. Near the fore and aft ends of rack 10 there are extending from its underside respective sway braces 15 making contact with the bomb 12.

As shown in more detail in FIGS. 2—5, each brace 15 includes two opposed bellcranks 18a and 18b of equal length and angles pivotally attached across each other in scissor fashion by a pin 14 intermediate their ends. Pin 14 is retained by opposed brackets 19a and 19b fixed between sides 10a of rack 10 with the central axis of pin 14 being generally aligned parallel with the length of the sides. Accordingly, sway braces 15 are disposed in planes generally normal to the length of the bomb rack 10 of bellcranks 18a and 18b having lower arms laterally extending below brackets 19a and 19b and upper arms extending generally upwards between sides 10a. Coil springs 13 mounted on posts 16, above pin 14 and extending inwardly from brackets 19a and 19b, are compressed at their ends respectively between brackets 19a and 19b and the upper arms of bellcranks 18a and 18b for urging the upper arms open.

A shaft 22 extends horizontally across the bomb rack 10 adjacent the upper arms of bellcranks 18a and 18b and protrudes from rack 10 on either side. A threaded sleeve 22d on shaft 22 between the sides 10a is keyed to turn with shaft 22 and is externally threaded in opposite directions over respective halves thereof. Clamps 26 on either half threadingly engage the sleeve 22d and are prevented from turning with sleeve 22d by guide pins 27 extending between sides 10a parallel to shaft 22. Turning of shaft 22 closes or opens the distance between clamps 26 resulting in a symmetrical displacement of sway braces 15 relative rack 10. Each lower arm of bellcranks 18a and 18b terminates with self-aligning pad 17 on the bottom side and makes contact with the bomb surface to place hooks 29 in tension and absorbing all free play within hangers 28. In order to provide a quick and repeatable procedure for extending and prestressing the sway brace 15, shaft 22 extends out of bomb rack 10 on either end and terminates with a torque limited nut 25 on either end, one being shown in cross section. Each nut 25 includes opposed torque adjusting screws 20 threaded into an opening normal to the shaft 22 compressing detent balls 23 through springs 21 into ball sockets 22a in shaft 22. The maximum torque thus transmitted by torque limiting nut 25 results in a maximum compressing load on pad 17 and a corresponding tension load in the hooks 28 thereby providing a prestressed connection of bomb 12 to rack 10.

Figure 4:
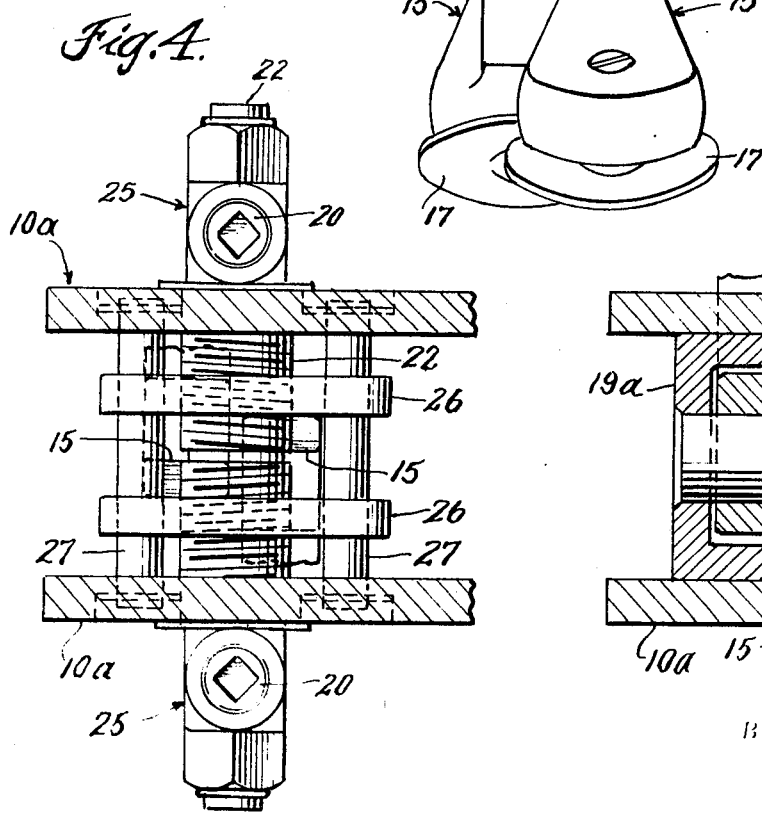
FIG. 4 is a plan view of the sway device taken as indicated by the arrows 4—4 in FIG. 3.
Figure 5:
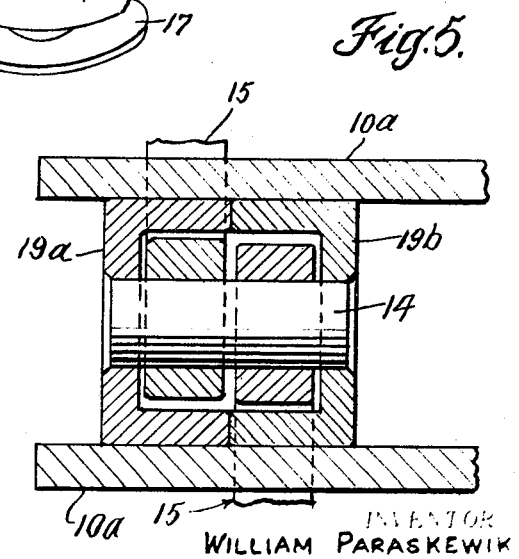
FIG. 5 is a plan section taken on the line 5—5 of FIG. 3.

As shown in FIG. 4 clamps 26 are disposed on sleeve 22d at equal respective adjacent sides 10a and pin 14 (in FIG. 5) is located centrally between sides 10a, thus the general alignment of the respective sway braces 15 is symmetrical with respect to rack 10. Accordingly the extension of sway braces 15 at the fore and aft ends of rack 10 results in a symmetrical bracing force at either end reducing the possibility of asymmetrical loading of the rack 10.

In operation the bomb 12 is initially mounted in the bomb rack 10 by hooks 29 engaging hangers 28 where it is free to pivot until restrained by sway braces 15. In order to restrain the bomb 12 in one position relative to the rack 10 sway braces 15 are brought down by turning nut 25 until pads 17 contact the bomb 12 surface. The turning of the nut 25 is continued until the desired stress level in the sway braces 15 is reached. Nut 25 is initially set to release at a predetermined torque level for a given bomb type with the aid of a torque wrench and the setting of screws 20.

Some of the many advantages and improvements over the prior art should now be readily apparent. The above-described invention provides significant improvements over the prior art by reducing the operational workload involved in the attachment of stores or bombs to an aircraft with the attendant feature that unwanted side loads can be easily controlled by controlling the installation tolerances of the individual sway braces. It allows for accurate sway brace alignment relative to the bomb rack such that a torque mismatch between front and back sway braces does not result in lateral stressing.

Obviously many modifications and variations of the present invention are possible in the light of the above teachings. It is therefore to be understood that within the scope of the appended claims the invention may be practiced otherwise than as specifically described.

What is claimed is:

1. A suspension apparatus for releasably suspending articles from an aircraft and securing suspended articles against movement relative to such aircraft until released therefrom, said apparatus comprising, in combination:

a rack unit formed to be attached to the aircraft, said rack including two longitudinal sides adapted to be attached at their upper edges to the aircraft, each extending in a plane generally downward and parallel with the longitudinal axis of said aircraft;

a releasable support hook for releasably suspending an article from said rack unit;

a plurality of opposed paired bellcranks pivotally attached to said rack unit and formed to abut the suspended article symmetrically on either side thereof to prevent relative movement between a suspended article and said rack, said bellcranks having upper and lower arms of corresponding equal lengths and subtended angles pivotally attached in common across each other, each pair operatively connected by the pivot centrally between the sides of said rack and disposed in generally normal planes to the longitudinal axis thereof, lower arms of said bellcranks extending below said rack for abutting the article and upper arms thereof extending into said rack intermediate the sides;

clamping means operatively connected to said bellcranks for simultaneously urging said bellcranks against the article with a predetermined force, said clamping means including a shaft extending across said rack proximate the upper arms of said bellcranks respectively journaled proximate the distal ends thereof with said sides, the distal ends of said shaft protruding beyond said rack, said shaft being externally threaded in opposite directions over respective halves of the shaft segment contained between said sides, a torque limited nut forming an integral part of said apparatus and operatively connected to said shaft at either end thereof, two clamps each threadably engaging respective sections of said shaft and engaging said upper arms therebetween, and a guide pin connected between said sides extending parallel with said shaft engaging said clamps, said shaft including detent sockets;

each said torque limited nut including a cylindrical opening disposed on an axis normal to said shaft and containing a detent ball registering with said socket, a spring abutting said ball at one end, and an adjustable set screw compressing the spring at the other end for determining the predetermined force to be applied to the suspended article by the lower arms of the bellcranks, and said suspension apparatus further comprising;

spring means operatively connected to said upper arms for urging said upper arms apart and said lower arms simultaneously into resilient opposing engagement with an article being moved into position for operative engagement with said support hook.

\* \* \* \* \*